United States Patent
Bhogal et al.

(10) Patent No.: US 9,454,411 B2
(45) Date of Patent: Sep. 27, 2016

(54) USER-SELECTABLE PROGRESS BAR THRESHOLD TRIGGERS AND NOTIFICATION BY DETECTING COLOR CHANGE

(75) Inventors: Kulvir Singh Bhogal, Fort Worth, TX (US); Robert Ross Peterson, Austin, TX (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1423 days.

(21) Appl. No.: 11/847,769

(22) Filed: Aug. 30, 2007

(65) Prior Publication Data

US 2009/0064143 A1 Mar. 5, 2009

(51) Int. Cl.
*G06F 9/54* (2006.01)
*G06F 3/048* (2013.01)
*G06F 11/30* (2006.01)
*G06F 11/32* (2006.01)

(52) U.S. Cl.
CPC .............. *G06F 9/542* (2013.01); *G06F 3/048* (2013.01); *G06F 11/30* (2013.01); *G06F 11/32* (2013.01); *G06F 2209/545* (2013.01)

(58) Field of Classification Search
USPC .................................. 715/772, 859; 705/7.15
See application file for complete search history.

(56) References Cited

U.S. PATENT DOCUMENTS

| | | | |
|---|---|---|---|
| 6,100,887 A | 8/2000 | Bormann et al. | |
| 6,104,398 A * | 8/2000 | Cox et al. | 715/821 |
| 6,639,687 B1 | 10/2003 | Neilsen | |
| 6,661,434 B1 * | 12/2003 | MacPhail | G06F 3/0481 715/772 |
| 6,874,130 B1 * | 3/2005 | Baweja | G06F 17/30067 707/E17.01 |
| 6,934,916 B1 * | 8/2005 | Webb et al. | 715/772 |
| 7,073,135 B2 | 7/2006 | Harris | |
| 7,568,151 B2 * | 7/2009 | Bargeron et al. | 715/231 |
| 7,697,922 B2 * | 4/2010 | McQuaide et al. | 455/412.2 |
| 8,521,891 B1 * | 8/2013 | Shinde | G06F 17/30902 709/206 |
| 2002/0087643 A1 * | 7/2002 | Parsons et al. | 709/206 |
| 2003/0005022 A1 * | 1/2003 | Brown | G06F 11/323 718/100 |
| 2003/0110190 A1 * | 6/2003 | Achiwa et al. | 707/203 |
| 2003/0112269 A1 * | 6/2003 | Lentz | G06F 3/04847 715/738 |
| 2003/0182409 A1 * | 9/2003 | Seaman | G06F 3/04847 709/223 |
| 2003/0220973 A1 * | 11/2003 | Zhu et al. | 709/205 |
| 2004/0078453 A1 * | 4/2004 | Bhogal | H04L 67/36 709/219 |
| 2004/0204823 A1 * | 10/2004 | Hashimoto | 701/200 |

(Continued)

FOREIGN PATENT DOCUMENTS

WO WO 2006016007 A1 * 2/2006

OTHER PUBLICATIONS

Haynes, "Stopwatch Pointer: A Dynamic Progress Indicator," IBM Technical Disclosure Bulletin, vol. 35, No. 1B, Jun. 1992, pp. 469-471.*

*Primary Examiner* — Benjamin Wu
(74) *Attorney, Agent, or Firm* — Mollborn Patents, Inc.; Fredrik Mollborn

(57) ABSTRACT

Methods and apparatus, including computer program products, implementing and using techniques for providing a notification to a user about the progress of a task running on a digital processing device. A user input identifying a progress indicator for the task running on the digital processing device is received. A user input selecting a threshold value is received. The threshold value indicates a point on the progress indicator at which the user is to be notified about the progress of the task. A notification is provided to the user when the threshold value is reached.

15 Claims, 2 Drawing Sheets

(56) References Cited

U.S. PATENT DOCUMENTS

| | | | |
|---|---|---|---|
| 2005/0102631 A1* | 5/2005 | Andreas | G06F 9/4443 715/772 |
| 2005/0165854 A1* | 7/2005 | Burnett et al. | 707/200 |
| 2005/0172239 A1 | 8/2005 | Liu et al. | |
| 2005/0183017 A1* | 8/2005 | Cain | 715/719 |
| 2005/0240881 A1* | 10/2005 | Rush et al. | 715/851 |
| 2006/0045470 A1 | 3/2006 | Poslinski et al. | |
| 2006/0048184 A1* | 3/2006 | Poslinski et al. | 725/45 |
| 2006/0085790 A1* | 4/2006 | Hintermeister | G06F 9/4443 718/100 |
| 2006/0143483 A1* | 6/2006 | Liebenow | 713/300 |
| 2006/0240803 A1* | 10/2006 | Valeriano et al. | 455/412.1 |
| 2007/0033129 A1* | 2/2007 | Coates | G06Q 40/06 705/36 R |
| 2007/0162844 A1* | 7/2007 | Woodall et al. | 715/517 |
| 2007/0168877 A1* | 7/2007 | Jain et al. | 715/772 |
| 2007/0266304 A1* | 11/2007 | Fletcher et al. | 715/500.1 |
| 2008/0065904 A1* | 3/2008 | Clark | 713/193 |
| 2008/0120565 A1* | 5/2008 | Stiso et al. | 715/771 |
| 2008/0244437 A1* | 10/2008 | Fischer | 715/772 |
| 2008/0256474 A1* | 10/2008 | Chakra | G06F 3/0481 715/772 |
| 2009/0037835 A1* | 2/2009 | Goldman | G06F 8/65 715/771 |
| 2009/0106684 A1* | 4/2009 | Chakra | G06F 3/04812 715/772 |

* cited by examiner

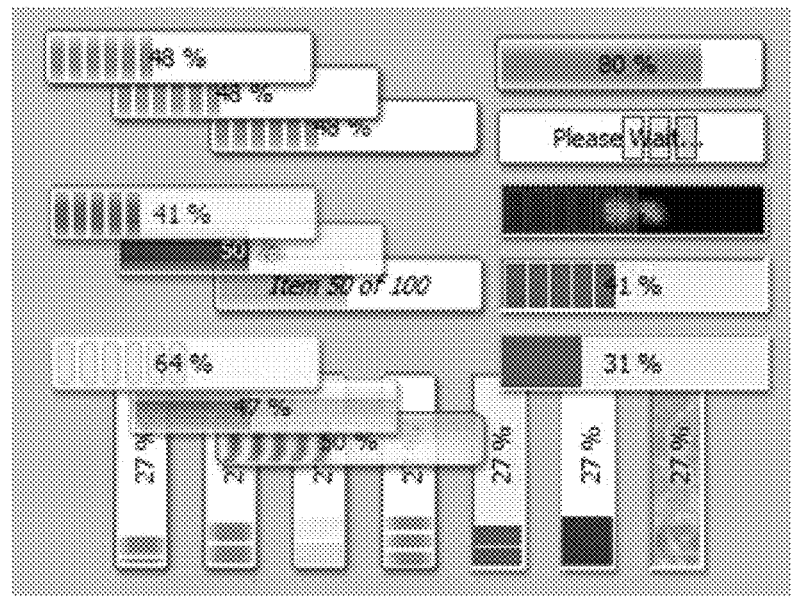
FIG. 1 – PRIOR ART
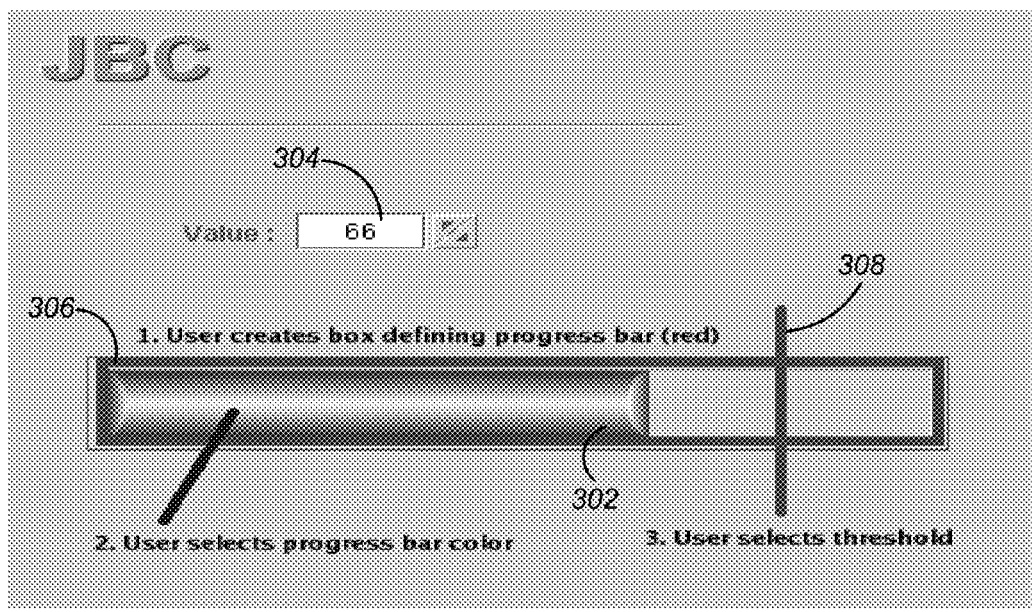
FIG. 3

USER-SELECTABLE PROGRESS BAR THRESHOLD TRIGGERS AND NOTIFICATION BY DETECTING COLOR CHANGE

BACKGROUND

This invention relates to installing and using desktop and web applications on different types of electronic devices. Sometimes a task running within a program on an electronic device, such as a computer, a personal digital assistant (PDA), a cellular telephone, a television set, and so on, might take a while to complete. Examples of common such tasks include downloading a file, installing a program component, or transferring a file. A user-friendly program typically provides some indication to the user that the task is occurring, how long the task might take, and how much work has already been done. One way of indicating that work is being done, and to indicate the amount of progress, is to use an animated image known as a progress bar.

The progress bar can be formally described as a component in a graphical user interface, and is used to convey the progress of a task, such as a download or file transfer. Often the graphic is accompanied by a textual representation of the progress, typically in a percentage format, which can indicate how far along the installation or download has proceeded, such as "53% done", or something similar. FIG. 1 shows some examples of progress indicators.

When a user must wait a large period of time for a progress indicator to complete, she often would like to perform a different task or activity while she is waiting. For example, a user may go have lunch while they wait for a file to download from the web. Unfortunately, when the user is away from her computer, there is no notification mechanism to let her know when the download or installation is complete or when a particular point in the installation or download has been reached.

SUMMARY

In general, in one aspect, the invention provides methods and apparatus, including computer program products, implementing and using techniques for providing a notification to a user about the progress of a task running on a digital processing device. A user input identifying a progress indicator for the task running on the digital processing device is received. A user input selecting a threshold value is received. The threshold value indicates a point on the progress indicator at which the user is to be notified about the progress of the task. A notification is provided to the user when the threshold value is reached.

The invention can be implemented to include one or more of the following advantages. A user can be notified about the progress of one or more tasks, such as, when a task is completed or when the task reaches one or more preset threshold values, even when the user is not present at the computer at which the task is occurring. This can free up significant amounts of time for the user to do other things while waiting for the task to complete and allow the user to multi-task. Furthermore, instead of (or in addition to) notifying a user, various system events, such as downloading or installing a different application, can be triggered when the task is completed or has reached the preset value defined by the user.

The details of one or more embodiments of the invention are set forth in the accompanying drawings and the description below. Other features and advantages of the invention will be apparent from the description and drawings, and from the claims.

DESCRIPTION OF DRAWINGS

FIG. 1 shows a prior art illustration of some exemplary progress bars that are used by current various applications to indicate progress of a task.

FIG. 3 is a screenshot of a user interface allowing a user to define one or more thresholds for notification about the progress of a task, in accordance with one embodiment of the invention.

Like reference symbols in the various drawings indicate like elements.

DETAILED DESCRIPTION

Figure 2:
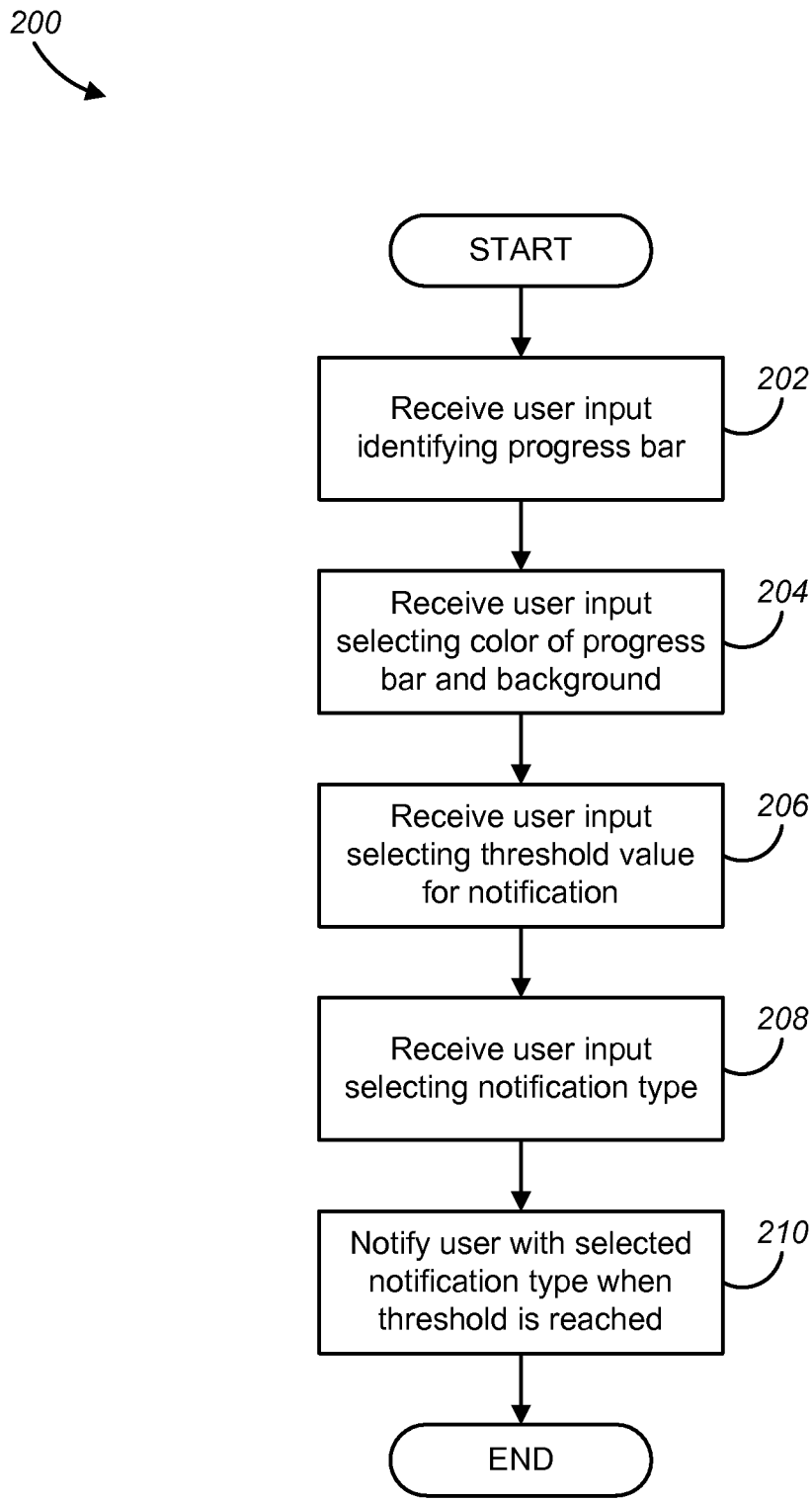
FIG. 2 is a flowchart showing a process for providing a notification to a user about the progress of a task, in accordance with one embodiment of the invention.

The various embodiments of this invention is prospective invention provides a generic user interface for the user to define an area of the screen as a progress indicator. A threshold is defined by the user. When this threshold is reached, a notification can be sent by SMS, email, instant message, and the like. For example, consider Alice who just started installing a middleware product on her computer. She realizes that the current progress indicator will take at least an hour to complete, so she decides to visit the company library. Before leaving, she defines an area of the computer screen that is the progress indicator for the software install. She also specifies that she should be notified by SMS when the progress indicator gets to 90%. Alice goes to the library. Seventy minutes later, she gets a text message on her phone that the install is 90% complete, so she heads back to her office.

The invention will be described below in further detail by way of example and with reference to a single task indicated by a single task bar. However, as the skilled person in the art realizes, any number of tasks can be simultaneously monitored in a similar manner, so the various embodiments of the invention is not limited to a single task.

As shown in FIG. 2, a process for providing a notification to a user about the progress of a task, in accordance with one embodiment of the invention, starts by receiving a user input defining a progress bar to be tracked (step 202). This can be done in a number of ways. In one implementation, the progress bar is identified by the user drawing a frame around the progress bar, using a drag-and-drop interface. In another implementation, the user simply clicks somewhere on the progress bar. In yet other implementations, the user can set a preference, before the actual download begins, as to when to be notified. This can be done, for example, through a drop-down menu or any other suitable user interface element for setting preferences, as is known to those of ordinary skill in the art. The progress bar can be located anywhere on the screen. FIG. 3 shows an example of a progress bar (302), which has a percentage value (304) (in this case 66%) showing how much of the task has been completed. As can be seen in FIG. 3, a user has identified the progress bar (302) by drawing a frame (306) around the progress bar.

Next, a user input is received selecting a color of the progress bar and a color of the background (step 204). This is done to allow the process to distinguish the progress bar from the background, and thereby to distinguish completed progress from pending progress and to tell the system when a threshold is reached.

After selecting a color of the progress bar, the process receives a user input selecting a threshold for notification (step 206). As can be seen in FIG. 3, in one implementation the threshold is selected by the user drawing a line (308) across the progress bar frame (306) at a point where the user would like to be notified. Assuming, for example, that a blue progress bar on a gray background was defined in step 204 above. After having defined the line (308) in step 206, the process knows that when the blue color reaches the line (308), a notification should be sent to the user. As can be seen in FIG. 3, the location of the line (308) corresponds to approximately when 80% of the task is done. In other implementations, the user can provide a numerical value, for example, 90%, in a frame similar to the progress value frame (304) in order to indicate when a notification should occur.

Next, the process receives a user input selecting a notification type (step 208). The user selects any of a number of notification methods that are known to those of ordinary skill in the art, such as SMS, email, page, phone call, and so on. In some implementations, the user's preferences can be saved so that the user does not have to select the notification type every time the process is run, whereas in other applications, the user is requested to enter the notification method and the corresponding email address, SMS address or telephone number for every desired notification.

Finally, the process tracks the progress bar and when the selected threshold is reached, the process notifies the user using the selected notification method (step 210), which ends the process.

As the skilled person realizes, the various embodiments of the invention can be implemented in a variety of ways. For example, the process can be implemented separately in each application that presents a progress bar. Alternatively, the process can also be implemented as a part of an operating system, so that the user can simply click the right button of his mouse on a progress bar and get the option of subscribing to a progress indicator threshold. In yet another alternative, the progress indicator subscription process can be implemented as part of a graphical user interface toolkit (e.g., a toolbar to be installed in a web browser). The various implementations of the invention described herein can be utilized essentially in every situation where there is a need for a user to be notified when a task has been completed.

In some embodiments, when multiple tasks (e.g., tasks A, B and C) are underway, the user can set notifications to occur, for example, when both task A and task B have reached 80% of being complete, or when task A and task B are complete and task C has reached 90%, or any other possible combination of tasks and threshold values.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. For example, the above example has focused on how to notify a single user, but it should be clear that any number of users could be notified using any variation of the above communication means. The progress bar has been described with reference to a particular color selected by a user, but it should be clear that any other type of indication could be used in alternative embodiments, such as a particular pattern selected by a user. The progress indicator does not have to be a rectangular progress bar, but can be any type of visual indicator capable of indicating proportional progress, such as a pie chart progress indicator, for example.

More then one threshold can also be set, so that the user receives a first notification, for example, when 50% of the task is done, and a second notification, for example, when 90% of the task is done. The various embodiments described above have been described in the context of a computer, but it should be clear that the same principles can be applied to any other type of digital processing device capable of running applications, such as a personal digital assistant (PDA), cellular telephone, television set, and so on.

The principles described above can be applied to any task that has an associated wait time, and for which the user wishes to be notified when a specific amount of time has passed or the task has reached a predefined state. In some implementations, other events can be triggered instead of, or in addition to, a user notification. For example, in some cases it may be desirable to start a second download after a first download has completed or almost completed, so the user may define other such tasks as a result of a task being completed. Accordingly, other embodiments are within the scope of the following claims.

The invention claimed is:

1. A computer-implemented method for notifying a user about the progress of a task, comprising:
   receiving a user input adding a visible mark on an application-independent progress bar, wherein the progress bar indicates the progress of a task performed under the control of a computer, and wherein the visible mark represents a first selected threshold; and
   in response to a determination that the progress of the task being performed under the control of the computer has reached the first selected threshold, sending a notification to a user, wherein the determination is performed by detecting when the point on the progress bar at which the visible mark is added changes colors.

2. The method of claim 1, wherein the task is selected from one or more of:
   downloading a file, installing a software program component, transferring a file, and loading a file.

3. The method of claim 1, wherein the notification includes one or more of:
   a short message service text message, an email, a web page, an instant message, and a telephone call.

4. The method of claim 3, further comprising:
   receiving a user input selecting one or more desired notification types.

5. The method of claim 1, further comprising:
   in response to a determination that the progress of the task being has reached a second selected threshold, sending a second notification to a user.

6. The method of claim 1, wherein sending a notification includes:
   sending a notification to a device that is different from the device on which the task is being performed.

7. The method of claim 1, further comprising:
   in response to a determination that the progress of a task being performed under the control of the computer has reached the first selected threshold, starting a different task under control of the computer.

8. A computer program product for notifying a user about the progress of a task, the computer program product comprising a non-transitory computer readable storage medium having program code embodied therewith, the program code being executable by a processor to:
   receive a user input adding a visible mark on an application-independent progress bar, wherein the progress bar indicates the progress of a task performed under the control of a computer, and wherein the visible mark represents a first selected threshold; and
   send a notification to the user, in response to a determination that a progress of the task being performed under the control of the computer has reached a first selected threshold, wherein the determination is performed by detecting when the point on the progress bar at which the visible mark is added changes colors.

9. The computer program product of claim 8, wherein the task is selected from one or more of: downloading a file, installing a software program component, transferring a file, and loading a file.

10. The computer program product of claim 8, wherein the notification includes one or more of: a short message service text message, an email, a web page, an instant message, and a telephone call.

11. The computer program product of claim 10, further comprising program code executable by the processor to:
    receive a user input selecting one or more desired notification types.

12. The computer program product of claim 8, further comprising program code executable by the processor to:
    sending a second notification to a user, in response to a determination that the progress of the task being has reached a second selected threshold.

13. The computer program product of claim 8, wherein sending a notification includes:
    sending a notification to a device that is different from the device on which the task is being performed.

14. The computer program product of claim 8, further comprising program code executable by the processor to:
    start a different task under control of the computer, in response to a determination that the progress of a task being performed under the control of the computer has reached the first selected threshold.

15. A system for notifying a user about the progress of a task, comprising:
    a processor;
    a memory coupled to the processor, wherein the memory contains instructions causing the processor to:
    receive a user input adding a visible mark on an application-independent progress bar, wherein the progress bar indicates the progress of a task performed under the control of a computer, and wherein the visible mark represents a first selected threshold; and
    send a notification to the user, in response to a determination that a progress of the task being performed under the control of the computer has reached a first selected threshold, wherein the determination is performed by detecting when the point on the progress bar at which the visible mark is added changes colors.

* * * * *